United States Patent
Fujiwara et al.

(10) Patent No.: US 12,270,435 B2
(45) Date of Patent: Apr. 8, 2025

(54) ROTOR FOR THRUST MAGNETIC BEARING, THRUST MAGNETIC BEARING, AND ROTARY FLUID MACHINE

(71) Applicant: DAIKIN INDUSTRIES, LTD., Osaka (JP)

(72) Inventors: Hideki Fujiwara, Osaka (JP); Satoru Yatake, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/885,770

(22) Filed: Sep. 16, 2024

(65) Prior Publication Data

US 2025/0035156 A1    Jan. 30, 2025

Related U.S. Application Data

(63) Continuation of application No. PCT/JP2023/012008, filed on Mar. 24, 2023.

(30) Foreign Application Priority Data

Mar. 28, 2022   (JP) ................................ 2022-052185

(51) Int. Cl.
*F16C 32/04*    (2006.01)
*F25B 31/02*    (2006.01)
(Continued)

(52) U.S. Cl.
CPC ........ *F16C 32/0476* (2013.01); *F25B 31/026* (2013.01); *H02K 7/09* (2013.01); *H02K 11/40* (2016.01)

(58) Field of Classification Search
CPC ..... F16C 32/0476; F25B 31/026; H02K 7/09; H02K 11/40
(Continued)

(56) References Cited

U.S. PATENT DOCUMENTS

| 4,033,877 A | 7/1977 | Klepp et al. |
| 4,438,542 A | 3/1984 | Schuh |

(Continued)

FOREIGN PATENT DOCUMENTS

| CN | 215344291 U | 12/2021 |
| DE | 102014209766 A1 | 11/2015 |

(Continued)

OTHER PUBLICATIONS

International Search Report and Written Opinion mailed on Jun. 6, 2023, received for PCT Application PCT/JP2023/012008, filed on Mar. 24, 2023, 11 pages including English Translation.

(Continued)

*Primary Examiner* — Ahmed Elnakib
(74) *Attorney, Agent, or Firm* — XSENSUS LLP

(57) ABSTRACT

A rotor for a thrust magnetic bearing is a rotor (51) of a thrust magnetic bearing (50) supporting a rotary shaft (30) that is driven to rotate by a motor (20) in an axial direction, and has a rotor passage (93) that penetrates the rotor (51) and constitutes part of a refrigerant passage (Z) for sending a refrigerant to the motor (20). It is preferable that the rotor passage (93) includes an opening (93*b*) on one side in the axial direction and an opening (93*a*) on the other side in the axial direction, and the opening (93*b*) on the one side is located radially outside (Q2) of the opening (93*a*) on the other side.

10 Claims, 9 Drawing Sheets

(51) Int. Cl.
*H02K 7/09* (2006.01)
*H02K 11/40* (2016.01)

(58) Field of Classification Search
USPC .................................................. 310/61, 90.5
See application file for complete search history.

(56) References Cited

U.S. PATENT DOCUMENTS

| | | | |
|---|---|---|---|
| 4,519,010 | A | 5/1985 | Elsaesser et al. |
| 4,535,373 | A | 8/1985 | Schuh |
| 4,554,473 | A | 11/1985 | Müller |
| 4,556,829 | A | 12/1985 | von der Heide |
| 4,599,664 | A | 7/1986 | Schuh |
| 4,604,665 | A | 8/1986 | Müller et al. |
| 4,658,312 | A | 4/1987 | Elsaesser et al. |
| 4,698,542 | A | 10/1987 | Müller |
| 4,779,165 | A | 10/1988 | Elsaesser et al. |
| 4,843,500 | A | 6/1989 | Elsaesser et al. |
| 4,882,511 | A | 11/1989 | von der Heide |
| 4,894,738 | A | 1/1990 | Elsaesser et al. |
| 4,922,406 | A | 5/1990 | Schuh |
| 4,935,654 | A * | 6/1990 | Glass ............... H02K 5/16 310/90.5 |
| 5,001,581 | A | 3/1991 | Elsaesser et al. |
| 5,006,943 | A | 4/1991 | Elsaesser et al. |
| 5,040,085 | A | 8/1991 | Elsaesser et al. |
| 5,128,819 | A | 7/1992 | Elsaesser et al. |
| 5,173,814 | A | 12/1992 | Elsaesser et al. |
| RE34,268 | E | 6/1993 | Müller |
| 5,216,557 | A | 6/1993 | Elsaesser et al. |
| RE34,412 | E | 10/1993 | Elsaesser et al. |
| 5,422,769 | A | 6/1995 | Elsaesser et al. |
| 5,424,887 | A | 6/1995 | Schuh |
| 5,446,610 | A | 8/1995 | Elsaesser et al. |
| 5,557,487 | A | 9/1996 | Elsaesser et al. |
| 5,708,539 | A | 1/1998 | Schuh |
| RE35,792 | E | 5/1998 | Elsasser et al. |
| 5,774,302 | A | 6/1998 | Elsaesser et al. |
| 5,777,822 | A | 7/1998 | Schuh |
| 5,801,900 | A | 9/1998 | Elsaesser et al. |
| 5,864,443 | A | 1/1999 | Elsaesser et al. |
| 5,946,161 | A | 8/1999 | Schuh |
| RE37,058 | E | 2/2001 | Elsasser et al. |
| RE38,178 | E | 7/2003 | Elsasser et al. |
| RE38,179 | E | 7/2003 | Elsasser et al. |
| 2021/0399597 | A1 * | 12/2021 | Tonari ............... H02K 21/14 |

FOREIGN PATENT DOCUMENTS

| | | | |
|---|---|---|---|
| EP | 4202245 | A1 | 6/2023 |
| JP | S62-085216 | A | 4/1987 |
| JP | H01-190231 | A | 7/1989 |
| JP | H02-157716 | A | 6/1990 |
| JP | H05-071533 | A | 3/1993 |
| JP | H0571533 | * | 3/1993 ............ F16C 32/047 |
| JP | H06-21349 | U | 3/1994 |
| JP | H07-176132 | A | 7/1995 |
| JP | 2005-282602 | A | 10/2005 |
| JP | 2020-167924 | A | 10/2020 |
| WO | 2015/176830 | A1 | 11/2015 |

OTHER PUBLICATIONS

Notice of Reasons for Refusal mailed on Jun. 6, 2023, received for JP Application 2023-048422, 13 pages including English Translation.

Decision to Grant a Patent mailed on Oct. 3, 2023, received for JP Application 2023-048422, 5 pages including English Translation.

English translation of International Preliminary Report On Patentability (Chapter I) mailed on Oct. 10, 2024, in corresponding PCT/JP2023/012008 , 7 pages.

Extended European search report issued on Feb. 20, 25, in corresponding European patent Application No. 23780262.4, 13 pages.

* cited by examiner

ROTOR FOR THRUST MAGNETIC BEARING, THRUST MAGNETIC BEARING, AND ROTARY FLUID MACHINE

CROSS-REFERENCE TO RELATED APPLICATIONS

The present application is a continuation application of PCT Application No. PCT/JP2023/012008, filed on Mar. 24, 2023, which corresponds to Japanese Patent Application No. 2022-052185, filed on Mar. 28, 2022, with the Japan Patent Office, and the entire disclosure of these applications is incorporated herein by reference.

TECHNICAL FIELD

The present disclosure relates to a rotor for a thrust magnetic bearing, a thrust magnetic bearing, and a rotary fluid machine.

BACKGROUND ART

Patent Document 1 discloses a centrifugal compressor. In the centrifugal compressor described in Patent Document 1, a rotary shaft is provided with a refrigerant passage passing the axis of the rotary shaft. The rotary shaft is rotated to generate a centrifugal force to supply a refrigerant into a casing through the refrigerant passage, thereby cooling a motor provided in the casing with the refrigerant.

CITATION LIST

Patent Document

Patent Document 1: Japanese Unexamined Patent Publication No. 2020-167924

SUMMARY

A first aspect is directed to a rotor for a thrust magnetic bearing. The rotor for the thrust magnetic bearing is a rotor (51) for a thrust magnetic bearing (50) supporting a rotary shaft (30) that is driven to rotate by a motor (20) in the axial direction. The rotor (51) is a component separate from the rotary shaft (30) and is fitted on the rotary shaft (30), and has a rotor passage (93) that penetrates the rotor (51) and constitutes part of a refrigerant passage (Z) for sending a refrigerant to the motor (20).

DESCRIPTION OF EMBODIMENTS

Embodiments of the present disclosure will be described in detail below with reference to the drawings. The present disclosure is not limited to the embodiments shown below, and various changes can be made within the scope without departing from the technical concept of the present disclosure. Each of the drawings is intended to illustrate the present disclosure conceptually, and dimensions, ratios, or numbers may be exaggerated or simplified as necessary for the sake of ease of understanding.

Exemplary embodiments will be described in detail below based on the drawings.

<General Configuration>

A compressor (100) will be described with reference to FIGS. 1 to 3. The compressor (100) is an example of a rotary fluid machine of the present invention. The compressor (100) is, for example, a centrifugal compressor. The compressor (100) sucks a refrigerant, compresses the sucked refrigerant, and discharges the compressed refrigerant. The refrigerant is, for example, a HFC refrigerant R32. Note that R32 is merely an example of the type of the refrigerant, and the compressor (100) may compress and discharge a refrigerant other than R32.

Figure 1:
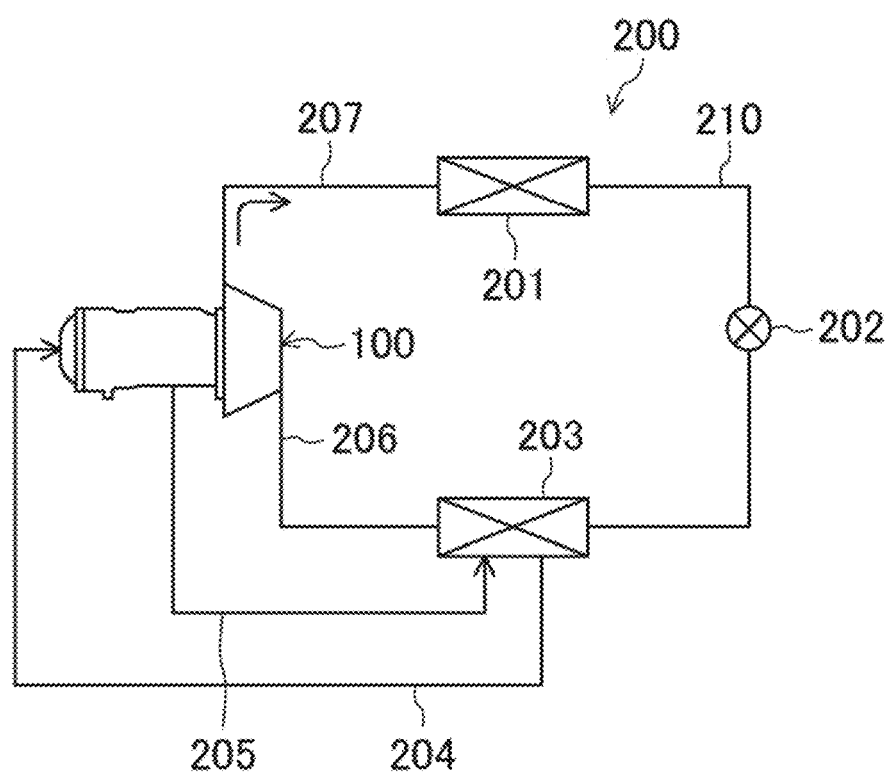
FIG. 1 is view of a schematic general configuration of a refrigeration apparatus according to an embodiment.

The compressor (100) is mounted on a refrigeration apparatus (200) as illustrated in FIG. 1. The refrigeration apparatus (200) includes a refrigerant circuit (210) filled with a refrigerant. The refrigerant circuit (210) includes the compressor (100), a condenser (201), an expansion valve (202), an evaporator (203), a refrigerant passage (206) provided between the compressor (100) and the evaporator (203), and a refrigerant passage (207) provided between the compressor (100) and the condenser (201).

A first branch passage (204) and a second branch passage (205) are connected to the refrigerant circuit (210). One end of the first branch passage (204) is connected to the evaporator (203). The other end of the first branch passage (204) is connected to an inlet end of a refrigerant passage (Z) (see FIG. 5) of the compressor (100). One end of the second branch passage (205) is connected to an outlet end of the refrigerant passage (Z). The other end of the second branch passage (205) is connected to the evaporator (203).

Figure 2:
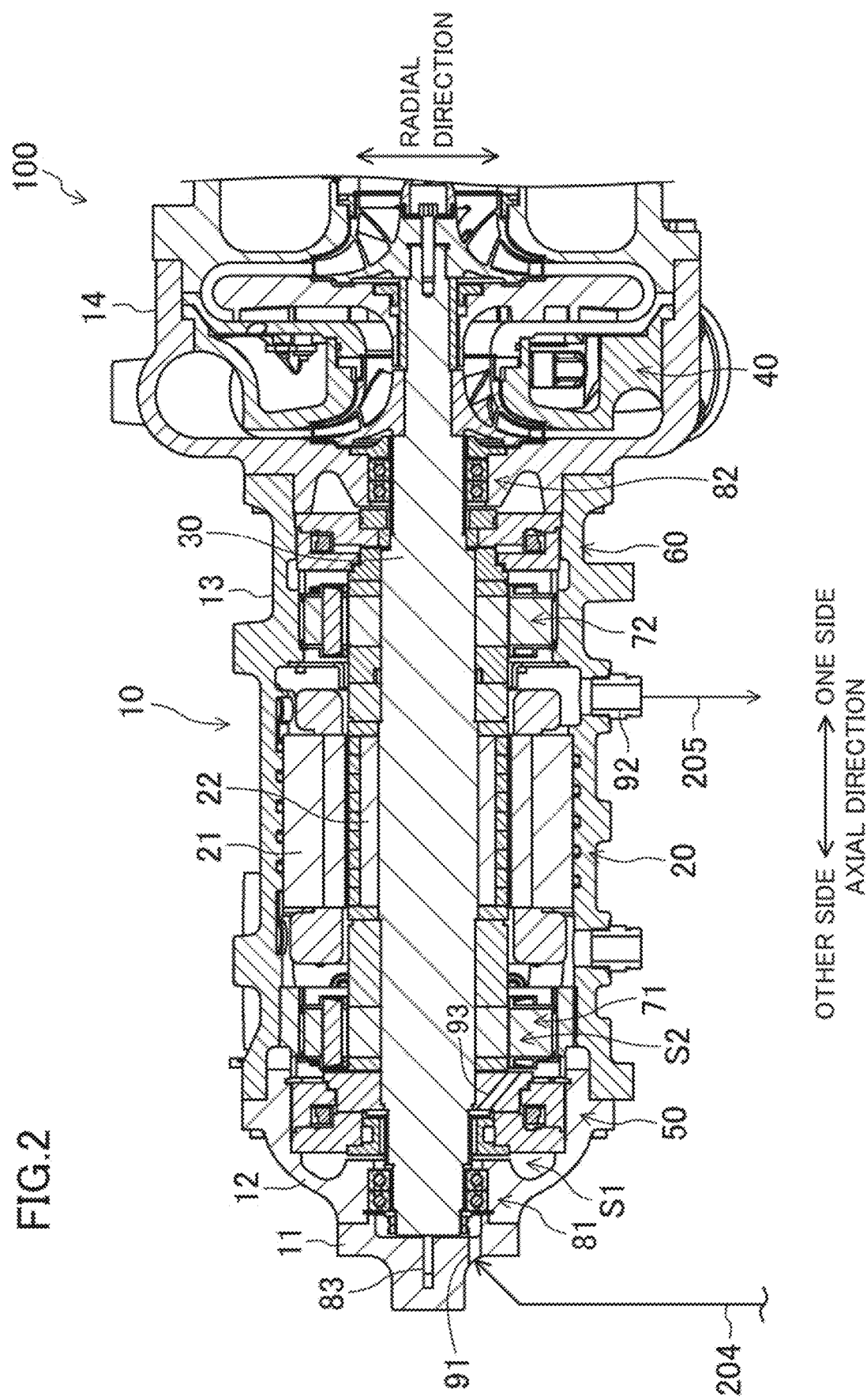
FIG. 2 is a cross-sectional view of a compressor.
Figure 3:
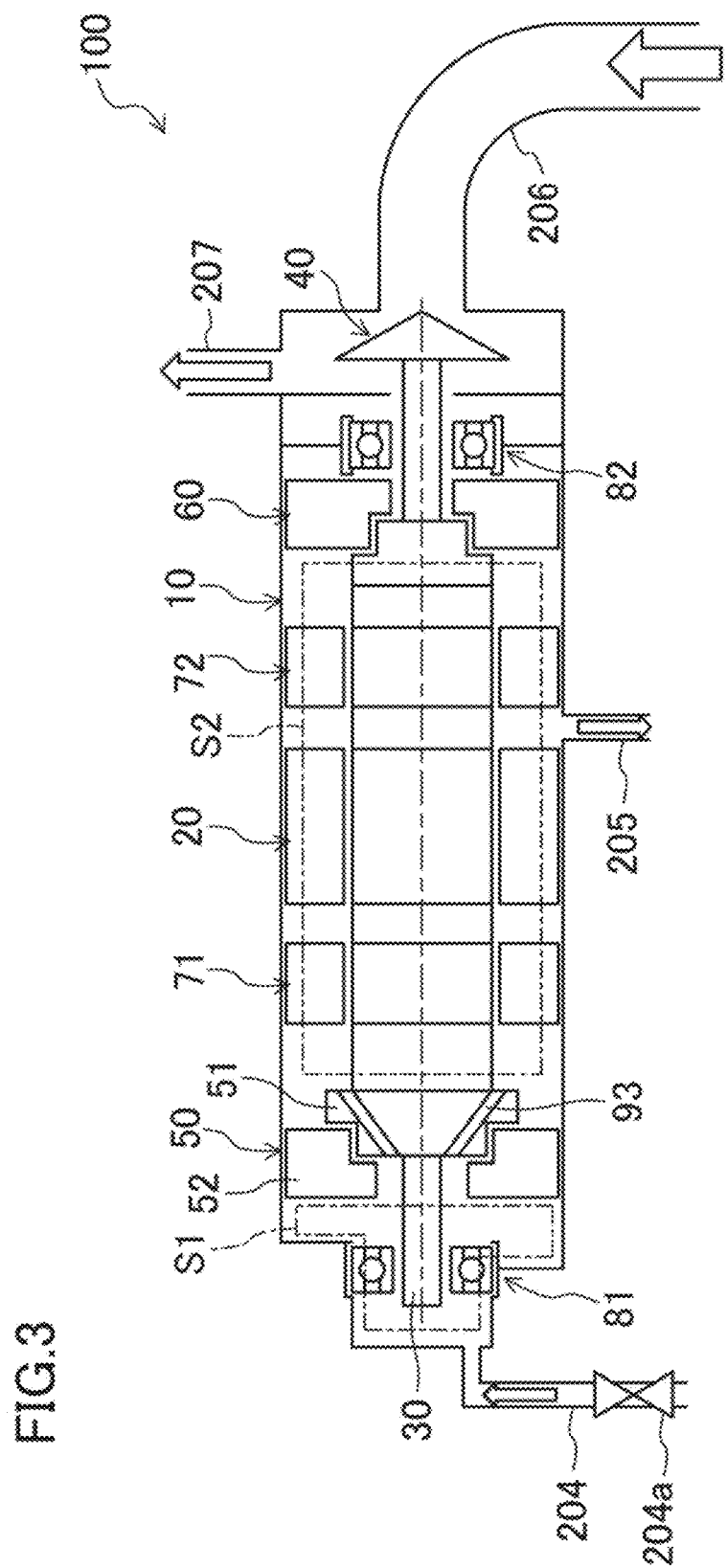
FIG. 3 is a schematic view of the compressor.

The compressor (100) compresses the refrigerant that has flowed into an impeller chamber that houses an impeller (40) by the rotation of the impeller (40) (see FIGS. 2 and 3). The refrigerant compressed by the compressor (100) is supplied to the condenser (201) through the refrigerant passage (207), and dissipates heat to the air in the condenser (201) to condense. The refrigerant condensed in the condenser (201) is decompressed through the expansion valve (202). The refrigerant decompressed through the expansion valve (202) absorbs heat from the air to evaporate in the evaporator (203). The refrigerant evaporated in the evaporator (203) is sent to the compressor (100) through the refrigerant passage (206), and is compressed again in the compressor (100).

Part of the refrigerant sent to the evaporator (203) is supplied to the compressor (100) through the first branch passage (204). The refrigerant supplied to the compressor (100) passes through the compressor (100), is then supplied to the second branch passage (205), and to the evaporator (203) via the second branch passage (205).

As illustrated in FIGS. 2 and 3, the compressor (100) includes a casing (10), a motor (20), a rotary shaft (30), an impeller (40), a first thrust magnetic bearing (50), a second thrust magnetic bearing (60), a first radial magnetic bearing (71), a second radial magnetic bearing (72), a first touchdown bearing (81), and a second touchdown bearing (82).

The casing (10) is a hollow member. The casing (10) includes a first casing portion (11), a second casing portion (12), a third casing portion (13), and a fourth casing portion (14). The first casing portion (11), the second casing portion (12), the third casing portion (13), and the fourth casing portion (14) are arranged in this order toward one side in an axial direction. The axial direction is a direction parallel to the direction in which the rotary shaft (30) extends.

The first casing portion (11) is provided to close an end of the casing (10) on one side in the axial direction. The second casing portion (12) is connected to the first casing portion (11). The first thrust magnetic bearing (50) and the first touchdown bearing (81) are placed in the second casing portion (12). The third casing portion (13) is connected to the second casing portion (12). The motor (20), the second thrust magnetic bearing (60), the first radial magnetic bearing (71), and the second radial magnetic bearing (72) are placed in the third casing portion (13). The fourth casing portion (14) is connected to the third casing portion (13). The impeller (40) and the second touchdown bearing (82) are placed in the fourth casing portion (14).

The motor (20) drives the rotary shaft (30) to rotate. When the rotary shaft (30) is driven to rotate, the impeller (40) (see FIGS. 2 and 3) rotates, and the refrigerant flowed into the impeller chamber is compressed. A stator (21) of the motor (20) is fixed to an inner peripheral wall of the casing (10). A rotor (22) is disposed inside the stator (21) in a radial direction. The radial direction is a direction perpendicular to the axial direction and passing through the axis (P) of the rotary shaft (30). The inside in the radial direction (Q1) is a side toward the axis (P) of the rotary shaft (30) in the radial direction. A radially outer side (Q2) is a direction away from the axis (P) of the rotary shaft (30) in the radial direction. The rotor (51) is fitted on the rotary shaft (30). The rotor (51) is a component separate from the rotary shaft (30).

The rotary shaft (30) is fixed to the radially inner side (Q1) of the rotor (22). The rotary shaft (30) extends in the axial direction. The impeller (40) is fixed to one side of the rotary shaft (30) in the axial direction.

The first radial magnetic bearing (71) is located on the other side of the motor (20) in the axial direction. The second radial magnetic bearing (72) is located on one side of the motor (20) in the axial direction. The first radial magnetic bearing (71) and the second radial magnetic bearing (72) support the rotary shaft (30) rotatably with respect to the casing (10) by magnetic levitation.

The first thrust magnetic bearing (50) and the second thrust magnetic bearing (60) support the rotary shaft (30) in the axial direction. Supporting the rotary shaft (30) in the axial direction means supporting the rotary shaft (30) such that the rotary shaft (30) is positioned within a predetermined range in the axial direction. The first thrust magnetic bearing (50) is located on the other side of the first radial magnetic bearing (71) in the axial direction. The first thrust magnetic bearing (50) pulls the rotary shaft (30) toward the other side in the axial direction by a magnetic force. The second thrust magnetic bearing (60) is located on one side of the second radial magnetic bearing (72) in the axial direction. The second thrust magnetic bearing (60) pulls the rotary shaft (30) toward the one side in the axial direction by a magnetic force.

Although the pressure toward the one side in the axial direction acts on the rotary shaft (30) with the rotation of the impeller (40), the first thrust magnetic bearing (50) pulls rotary shaft (30) to the other side in the axial direction, thereby bringing the axial forces acting on the impeller (40) in balance. If the pulling force of the first thrust magnetic bearing (50) (the force pulling the rotary shaft (30) toward the other side in the axial direction) is excessive, the rotary shaft (30) is pulled toward the one side in the axial direction by the second thrust magnetic bearing (60).

The first touchdown bearing (81) is located on the other side of the first thrust magnetic bearing (50) in the axial direction. The second touchdown bearing (82) is located on the one side of the second thrust magnetic bearing (60) in the axial direction. The first touchdown bearing (81) and the second touchdown bearing (82) function as bearings when the compressor (100) is out of control due to some trouble (e.g., when the rotary shaft (30) cannot be magnetically levitated due to a power failure that stops the power supply to the first radial magnetic bearing (71) or any other components). This can protect the first thrust magnetic bearing (50), the second thrust magnetic bearing (60), the first radial magnetic bearing (71), and the second radial magnetic bearing (72).

The rotary shaft (30) is provided with a grounding member (83). The grounding member (83) is a member that grounds the rotary shaft (30). The grounding member (83) protects sensors provided for the compressor (100) by passing charged electricity to the rotor (22). The grounding member (83) includes, for example, a carbon rod. The grounding member (83) is provided on the one side of the rotary shaft (30) in the axial direction. The grounding member (83) faces an axial portion (30a). The axial portion (30a) is a portion of the other end of the rotary shaft (30) in the axial direction and is around the axis (P). The grounding member (83) is pressed against the rotary shaft (30) by an elastic member such as a spring.

First Embodiment

Figure 4:
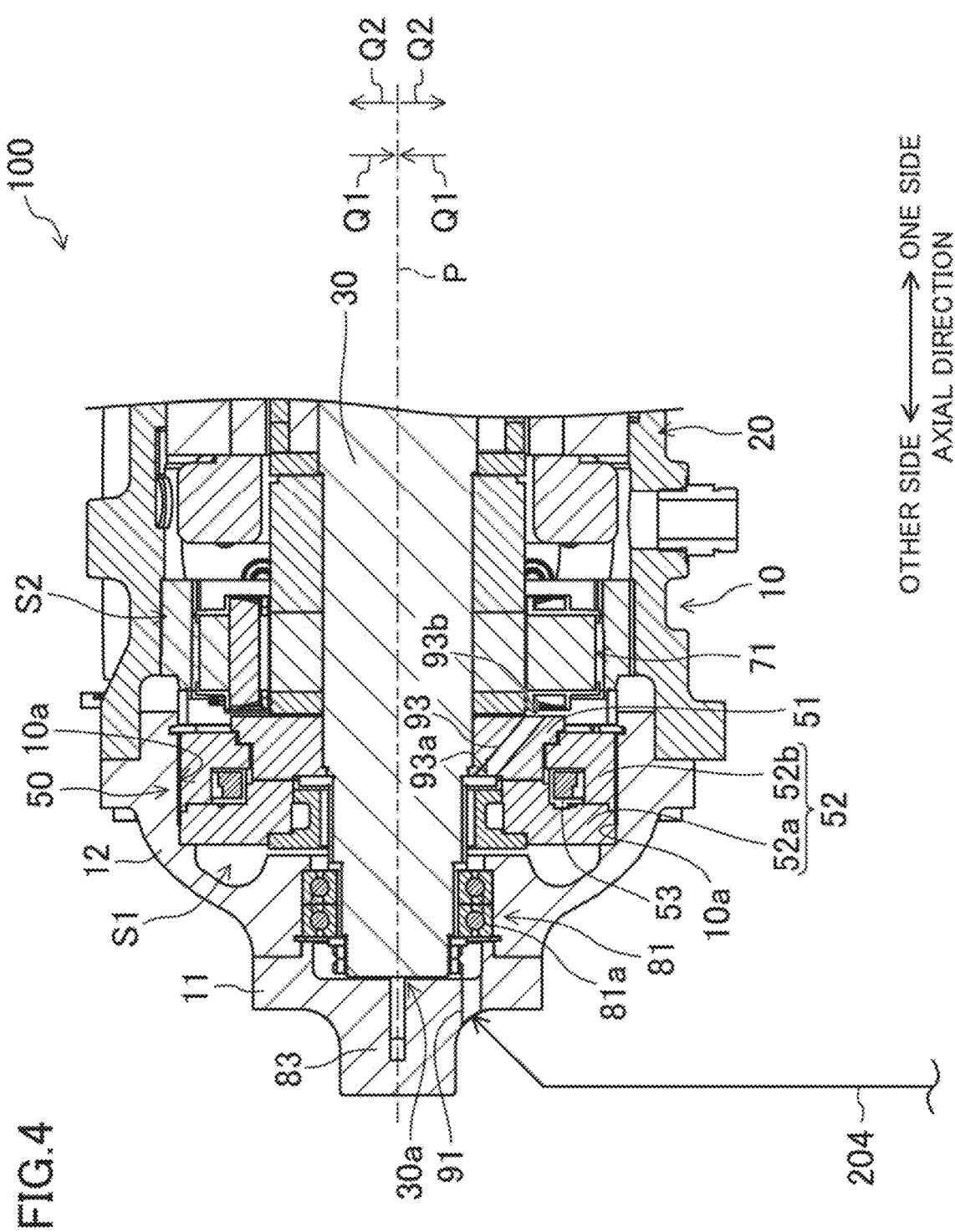
FIG. 4 is a partially enlarged view of the compressor shown in FIG. 2.

As illustrated in FIGS. 2 to 4, the first touchdown bearing (81) includes a bearing (81a). The bearing (81a) rotatably supports the rotary shaft (30). The first thrust magnetic bearing (50) is provided on one side of the bearing (81a) in the axial direction.

The first thrust magnetic bearing (50) includes a rotor (51), a stator (52) disposed to face the rotor (51), and a coil (53) wound around the stator (52).

The rotor (51) is fixed to the rotary shaft (30) and rotates together with the rotary shaft (30).

The stator (52) is provided radially outside (Q2) of the rotor (51). The stator (52) includes a first stator portion (52a) and a second stator portion (53b). The first stator portion (52a) and the second stator portion (53b) are fixed to each other. The first stator portion (52a) is disposed on the other side of the second stator portion (53b) in the axial direction. The first stator portion (52a) faces the rotor (51) from the other side in the axial direction. The second stator portion (53b) faces the rotor (51) from radially outside (Q2). In this embodiment, the stator (52) includes a plurality of components (the first stator portion (52a) and the second stator portion (53b)), but the present invention is not limited to this example. Any number of components the stator (52) may include, and for example, the stator (52) may include a single member.

<Space in Casing>

The casing (10) includes a first space (S1) and a second space (S2).

The first space (S1) is located on the one side of the first thrust magnetic bearing (50) in the axial direction. The bearing (81a) of the first touchdown bearing (81) is placed in the first space (S1). The second space (S2) is located on the other side of the first thrust magnetic bearing (50) in the axial direction. The components such as the first radial magnetic bearing (71) and the motor (20) are placed in the second space (S2).

The casing (10) has a first communication hole (91) and a second communication hole (92). The first communication hole (91) allows the first space (S1) to communicate with the outside of the casing (10). The first communication hole (91) is provided in the first casing portion (11). The first branch passage (204) (see FIG. 1) communicates with the first communication hole (91). The second communication hole (92) allows the second space (S2) to communicate with the outside of the casing (10). The second communication hole (92) is provided in the third casing portion (13). The second branch passage (205) (see FIG. 1) communicates with the second communication hole (92).

The rotor (51) has a rotor passage (93). The rotor passage (93) is a hole penetrating the rotor (51). The rotor passage (93) includes a first rotor opening (93a) and a second rotor opening (93b). Each of the first rotor opening (93a) and the second rotor opening (93b) allows the inside and outside of the rotor passage (93) to communicate with each other. The second rotor opening (93b) is located radially outside (Q2) of the first rotor opening (93a). The second rotor opening (93b) is located on the one side of the first rotor opening (93a) in the axial direction. In the first embodiment, the rotor passage (93) has a shape extending linearly from the first rotor opening (93a) toward the second rotor opening (93b). The rotor passage (93) communicates with the first space (S1) via the first rotor opening (93a), and with the second space (S2) via the second rotor opening (93b).

<Configuration for Partitioning Space in Casing>

The space in the casing (10) is partitioned into a first space (S1) and a second space (S2) by the first thrust magnetic bearing (50).

When the space in the casing (10) is partitioned into the first space (S1) and the second space (S2), the first space (S1) and the second space (S2) may be completely blocked from communicating with each other so that no fluid flows between the first space (S1) and the second space (S2), or the first space (S1) and the second space (S2) may slightly communicate with each other to such an extent that a differential pressure generated between the first space (S1) and the second space (S2) by adjusting the air pressure of the first space (S1) and the air pressure of the second space (S2) is maintained.

The following description will discuss a configuration in which the first thrust magnetic bearing (50) partitions the space in the casing (10) into the first space (S1) and the second space (S2).

The first space (S1) and the second space (S2) are separated by employing a close contact configuration of bringing the stator (52) of the first thrust magnetic bearing (50) into close contact with an inner wall (10a) of the casing (10) and the property of the first thrust magnetic bearing (50).

<Close Contact Configuration>

The stator (52) of the first thrust magnetic bearing (50) is brought into close contact with the inner wall (10a) of the casing (10) by, for example, shrink fitting. When the stator (52) makes close contact with the inner wall (10a) of the casing (10), no clearance is left between the stator (52) and the inner wall (10a) of the casing (10), or a small clearance is left between the stator (52) and the inner wall (10a) of the casing (10) to such an extent that the space in the casing (10) is kept partitioned into the first space (S1) and the second space (S2) (the differential pressure between the first space (S1) and the second space (S2) is maintained).

<Property of First Thrust Magnetic Bearing>

The first thrust magnetic bearing (50) is configured to support the rotor (51), which is a rotating body, in a non-contact manner by an electromagnetic force, and the magnitude of the force that supports the rotor (51) is determined for the size of the clearance between the rotor (51) and the stator (52). Thus, the clearance needs to be created with high accuracy to stably support the rotor (51). The first thrust magnetic bearing (50) has the narrower clearance between the rotor (51) as a rotating member and the stator (52) as a fixed member, than the other thrust magnetic bearings. For example, the clearance between the rotor (51) and the stator (52) of the first thrust magnetic bearing (50) is about 0.5 mm to 1 mm. In contrast, the clearance between the stator (21) and the rotor (22) of the motor (20) is, for example, about 3 mm. The inventors of the present invention have found the property of the first thrust magnetic bearing (50), i.e., accurately forming the first thrust magnetic bearing (50) with a small clearance between the rotor (51) and the stator (52) effectively seals the clearance between the rotor (51) and the stator (52), and thus effectively keeps a fluid from flowing through the clearance between the rotor (51) as the rotating member and the stator (52) as the fixed member. For this property, the first thrust magnetic bearing (50) is employed as a partitioning member that separates the first space (S1) and the second space (S2).

The close contact configuration can keep the fluid from flowing between the stator (52) and the inner wall (10a) of the casing (10), and the property of the first thrust magnetic bearing (50) can keep the fluid from flowing between the rotor (51) as the rotating member and the stator (52) as the fixed member. Thus, when the close contact configuration and the property of the first thrust magnetic bearing (50) are employed, the first space (S1) and the second space (S2) can be separated from each other, and the differential pressure between the first space (S1) and the second space (S2) can be effectively maintained. In the first embodiment, the pressure (air pressure) in the first space (S1) is lower than the pressure of the refrigerant just evaporated in the evaporator (203), and the pressure in the second space (S2) is substantially equal to the pressure of the refrigerant just evaporated in the evaporator (203).

<Refrigerant Passage>

Figure 5:
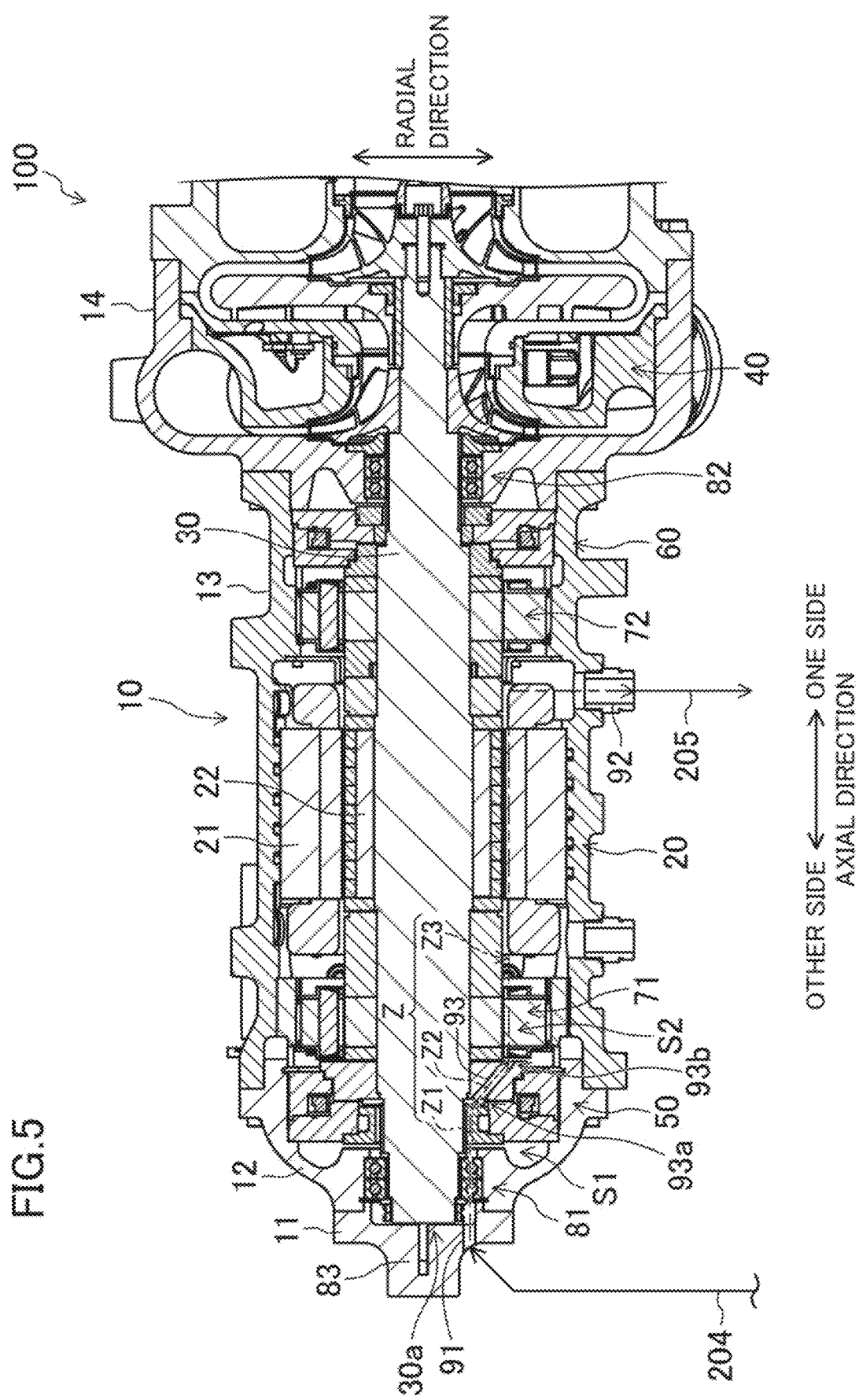
FIG. 5 is a view of a refrigerant passage.

As illustrated in FIG. 5, a refrigerant passage (Z) is provided in the casing (10). The refrigerant passage (Z) is a passage for sending the refrigerant to the motor (20). The refrigerant flowing through the refrigerant passage (Z) may be gas or may contain liquid such as mist. The refrigerant passage (Z) includes a first passage (Z1), an intermediate passage (Z2), and a second passage (Z3).

The first passage (Z1) is a refrigerant passage provided in the first space (S1). The first passage (Z1) communicates with the first branch passage (204) (see FIG. 1) and the intermediate passage (Z2). The first passage (Z1) extends from the first communication hole (91) to the first space (S1), passes through the bearing (81a) in the first space (S1), and communicates with the intermediate passage (Z2).

The intermediate passage (Z2) is a refrigerant passage provided in the first thrust magnetic bearing (50), and is located between the first space (S1) and the second space (S2). The intermediate passage (Z2) communicates with the first passage (Z1) and the second passage (Z3). In the first embodiment, the intermediate passage (Z2) is constituted of the rotor passage (93). In the first embodiment, the first rotor opening (93a) of the rotor passage (93) communicates with the first passage (Z1), and the second rotor opening (93b) of the rotor passage (93) communicates with the second passage (Z3).

The second passage (Z3) is a refrigerant passage provided in the second space (S2). The second passage (Z3) communicates with the intermediate passage (Z2) and the second branch passage (205) (see FIG. 1). The second passage (Z3) extends from the intermediate passage (Z2), passes through the first radial magnetic bearing (71) and the motor (20), and communicates with the second communication hole (92).

<Cooling Operation of Motor>

As illustrated in FIG. 5, the motor (20) drives the rotary shaft (30) to rotate, and the rotor (51) of the first thrust magnetic bearing (50) rotates together with the rotary shaft (30). As described above, the second rotor opening (93b) is located radially outside (Q2) of the first rotor opening (93a) in the rotor passage (93). Thus, when the rotor (51) rotates, a centrifugal force acts on the refrigerant in the rotor passage (93) to send the refrigerant from the first rotor opening (93a) toward the second rotor opening (93b). This allows the rotor passage (93) rotating together with the rotary shaft (30) to function as a pump for sending the refrigerant. Thus, the pumping function of the rotor passage (93) can effectively send the refrigerant flowing through the first branch passage (204) (see FIG. 1) to the first passage (Z1), the intermediate passage (Z2), and the second passage (Z3) in this order.

The refrigerant flowing between the stator (21) and the rotor (22) of the motor (20) in the second passage (Z3) cools the rotor (22) of the motor (20). The refrigerant that has flowed through the second passage (Z3) is sent to the second branch passage (205) through the second communication hole (92).

The above-described structure in which the rotor (51) is provided with the rotor passage (93) and the refrigerant is sent by the pumping function of the rotor passage (93) is a first example of a pump structure of the present invention.

Advantages

As described above, the rotor (51) of the first thrust magnetic bearing (50) has the rotor passage (93) that penetrates the rotor (51) and constitutes part of the refrigerant passage (Z) for sending the refrigerant to the motor (20). Thus, when the motor (20) rotates the rotary shaft (30), the rotor (51) rotates together with the rotary shaft (30) to exert a centrifugal force on the refrigerant in the rotor passage (93), and thus, by the centrifugal force, the refrigerant is effectively caused to flow through the refrigerant passage (Z). This allows the refrigerant to effectively flow through the refrigerant passage (Z) without accurately forming the refrigerant passage (Z) passing through the axis (P) of the rotary shaft (30). That is, a simple structure allows the refrigerant to flow through the refrigerant passage (Z) using the centrifugal force generated by the rotation of the rotary shaft (30).

Further, the refrigerant passage (Z) passing through the axis (P) of the rotary shaft (30) is no longer necessary, thereby eliminating the need of accurate machining of the rotary shaft (30). This can reduce cost increases in manufacturing the compressor (100).

The refrigerant passage (Z) passing through the axis (P) of the rotary shaft (30) is not required, and thus, the grounding member (83) can be arranged to face the axial portion (30a) of the rotary shaft (30). This can reduce wear of the grounding member (83) that slides on the rotary shaft (30) with the rotation of the rotary shaft (30).

In the rotor passage (93), the second rotor opening (93b) is located radially outside (Q2) of the first rotor opening (93a). Thus, the centrifugal force generated by the rotation of the rotary shaft (30) can effectively send the refrigerant from the first rotor opening (93a) toward the second rotor opening (93b) in the rotor passage (93).

The first thrust magnetic bearing (50) partitions the space in the casing (10) into the first space (S1) and the second space (S2). This can keep the refrigerant sent to the second space (S2) through the rotor passage (93) by the pumping function of the rotor passage (93) from flowing back to the first space (S1) through the clearance between the stator (52) of the first thrust magnetic bearing (50) and the inner wall (10a) of the casing (10) due to close contact with each other as described above, and can keep the refrigerant from flowing back to the first space (S1) through the clearance between the rotor (51) and stator (52) of the first thrust magnetic bearing (50) by using the above-described property of the first thrust magnetic bearing (50). Thus, the second space (S2) can be more pressurized than the first space (S1). Therefore, the differential pressure (a difference in pressure) between the first space (S1) and the second space (S2) can pull the rotary shaft (30) toward the other side in the axial direction. As a result, when the rotation of the impeller (40) pulls the rotary shaft (30) to the one side in the axial direction, the rotary shaft (30) can be pulled to the other side in the axial direction by using not only the pulling force of the first thrust magnetic bearing (50) but also the differential pressure between the first space (S1) and the second space (S2). Making use of the differential pressure between the first space (S1) and the second space (S2) can reduce the pulling force of the first thrust magnetic bearing (50), thereby reducing the size of the first thrust magnetic bearing (50). Further, the pulling force of the first thrust magnetic bearing (50) can be reduced, and the power consumed by the first thrust magnetic bearing (50) can be reduced.

Second Embodiment

A second embodiment of the compressor (100) will be described with reference to FIG. 6. The second embodiment is different from the first embodiment in the shape of the rotor passage (93). Thus, differences from the first embodiment will be mainly described below.

Figure 6:
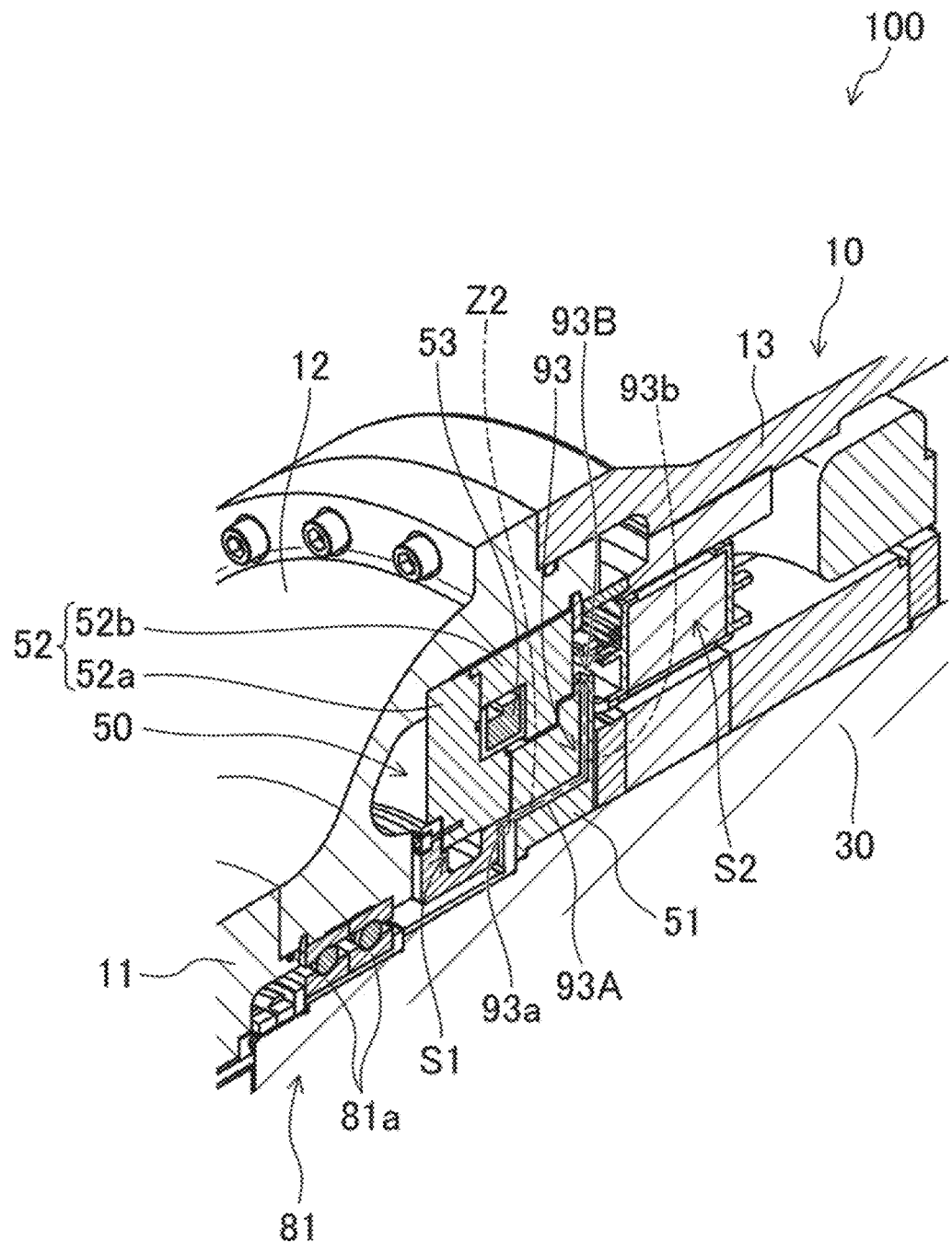
FIG. 6 is a view of a second embodiment of the compressor.

As illustrated in FIG. 6, the intermediate passage (Z2) is formed by the rotor passage (93). The rotor passage (93) includes a first rotor passage portion (93A) and a second rotor passage portion (93B). The first rotor passage portion (93A) and the second rotor passage portion (93B) extend in directions perpendicular to each other. The first rotor passage portion (93A) extends in parallel to the axial direction. A first rotor opening (93a) communicating with the first space (S1) is provided on the other side of the first rotor passage portion (93A) in the axial direction. The second rotor passage portion (93B) extends in the radial direction. A radially inner (Q1) part of the second rotor passage portion (93B) communicates with an end of the first rotor passage portion (93A) on one side in the axial direction. A second rotor opening (93b) communicating with the second space (S2) is provided radially outside (Q2) of the second rotor passage portion (93B).

As described above, when the rotor passage (93) is formed into a substantially L-shape by the first rotor passage portion (93A) and the second rotor passage portion (93B), the second rotor opening (93b) can be formed at the radially outermost position of the rotor (51). This can improve the efficiency of pumping the refrigerant by the pumping function of the rotor passage (93).

Third Embodiment

A third embodiment of the compressor (100) will be described with reference to FIG. 7. The third embodiment is different from the first embodiment in the shape of the intermediate passage (Z2). Thus, differences from the first embodiment will be mainly described below.

Figure 7:
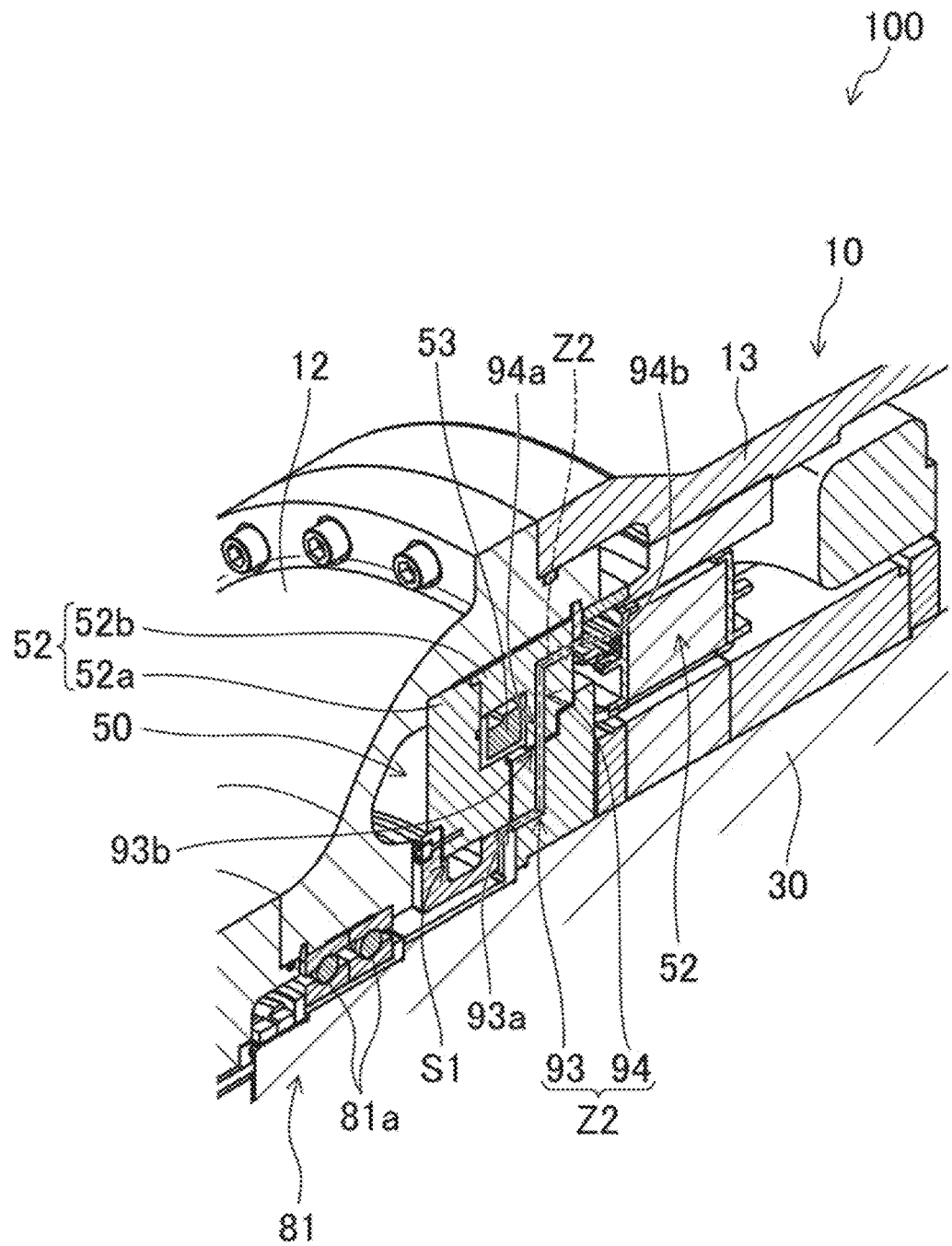
FIG. 7 is a view of a third embodiment of the compressor.

As illustrated in FIG. 7, the intermediate passage (Z2) includes a rotor passage (93) and a stator passage (94). Each of the rotor passage (93) and the stator passage (94) has a substantially L-shape. The rotor passage (93) communicates with the first space (S1) via the first rotor opening (93a). The stator passage (94) communicates with the second space (S2) via the second stator opening (94b).

The stator passage (94) is a hole formed in the stator (52) to penetrate the stator (52). In the third embodiment, the stator passage (94) is provided in the second stator portion (53b). The stator passage (94) is provided radially outside (Q2) of the rotor passage (93). The stator passage (94) includes a first stator opening (94a) and a second stator opening (94b). Each of the first stator opening (94a) and the second stator opening (94b) allows the inside and outside of the stator passage (94) to communicate with each other. The second stator opening (94b) is located radially outside (Q2) of the first stator opening (94a). The second stator opening (94b) is located on one side of the first stator opening (94a) in the axial direction.

In terms of axial position, the first stator opening (94a) is located at the same position as the second rotor opening (93b) of the rotor passage (93). When the rotary shaft (30) rotates, the second rotor opening (93b) rotates together with the rotary shaft (30), and the second rotor opening (93b) faces the first stator opening (94a), allowing the rotor passage (93) to communicate with the stator passage (94). The stator passage (94) communicates with the second space (S2) via the second stator opening (94b).

When the rotor passage (93) and the stator passage (94) communicate with each other, the refrigerant flowing through the first passage (Z1) flows into the rotor passage (93), and is sent to the stator passage (94). Thus, the stator (52) can be cooled by the refrigerant flowing through the stator passage (94).

Fourth Embodiment

A fourth embodiment of the compressor (100) will be described with reference to FIGS. 8 and 9. The fourth embodiment is different from the third embodiment in the structure for allowing the rotor passage (93) and the stator passage (94) to communicate with each other. Thus, differences from the third embodiment will be mainly described below.

Figure 8:
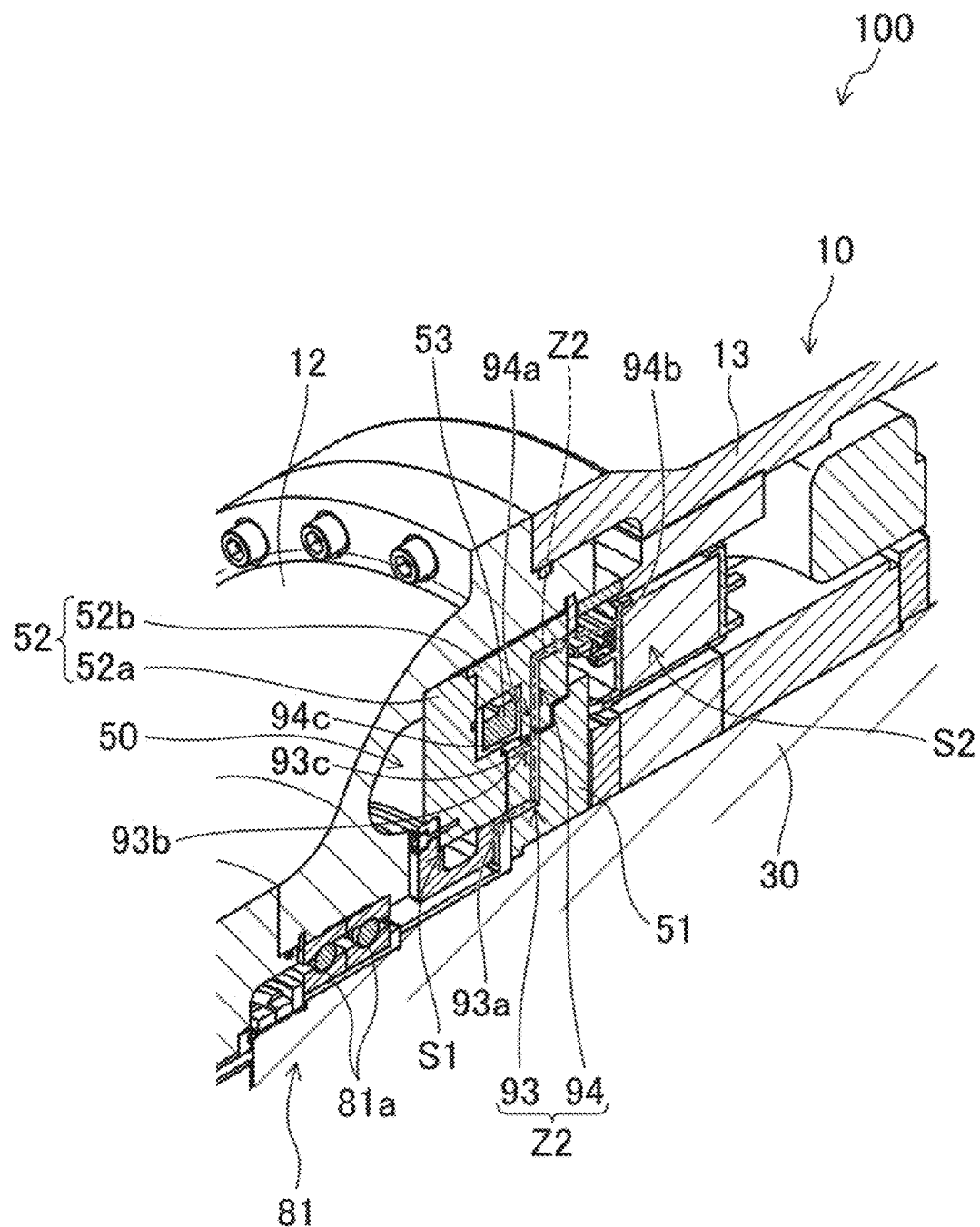
FIG. 8 is a view of a fourth embodiment of the compressor.
Figure 9:
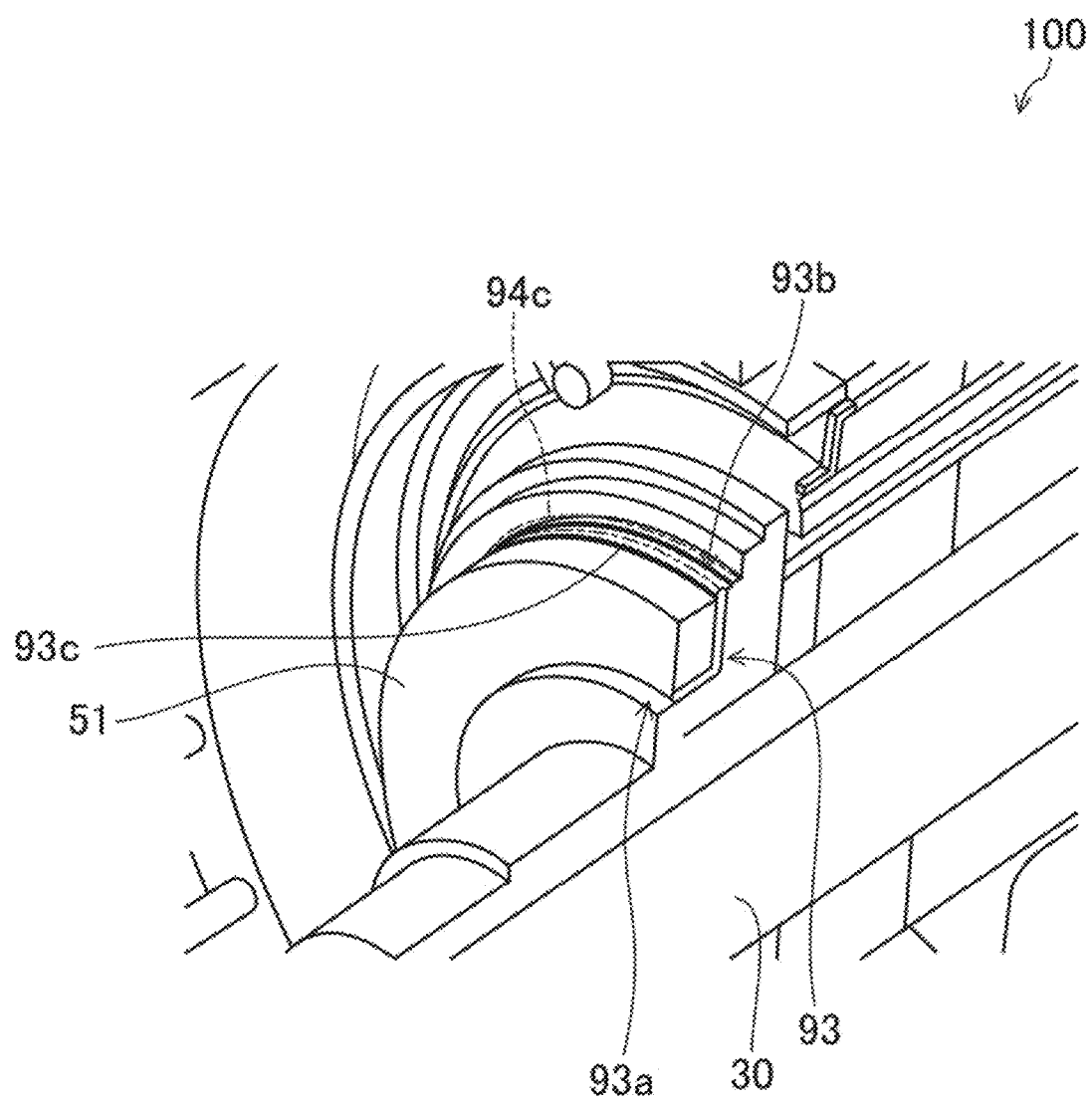
FIG. 9 is a perspective view of the structure of an outer periphery of a rotor for a first thrust magnetic bearing.

As illustrated in FIGS. 8 and 9, the intermediate passage (Z2) further includes a rotor groove (93c). The rotor groove (93c) is formed in the outer periphery of the rotor (51). The rotor groove (93c) is formed annularly around the axis (P) of the rotary shaft (30). A second rotor opening (93b) is formed in the rotor groove (93c). The rotor groove (93c) communicates with the rotor passage (93) via the second rotor opening (93b).

A stator groove (94c) is formed in the inner periphery of the stator (52). The stator groove (94c) is formed annularly around the axis (P) of the rotary shaft (30). A first stator opening (94a) is formed in the stator groove (94c). The stator groove (94c) communicates with the stator passage (94) via the first stator opening (94a). The rotor groove (93c) is disposed radially inside (Q1) of the stator groove (94c).

The refrigerant flowing through the first passage (Z1) flows into the rotor passage (93), and is sent to the stator passage (94) through the rotor groove (93c) and the stator groove (94c). Thus, the stator (52) can be cooled by the refrigerant flowing through the stator passage (94). Providing the rotor groove (93c) and the stator groove (94c) keeps the rotor passage (93) and the stator passage (94) in communication with each other. This allows the refrigerant to stably flow from the rotor passage (93) to the stator passage (94). As a result, the refrigerant can stably flow, thereby effectively keeping the rotary shaft (30) from vibrating.

While the embodiments and the variations thereof have been described above, it will be understood that various changes in form and details may be made without departing from the spirit and scope of the claims (e.g., (1) and (2) below). The embodiments, the variations, and the other embodiments may be combined and replaced with each other without deteriorating intended functions of the present disclosure.

<Variation of Close Contact Configuration>
(1) A variation of the close contact configuration will be described below. In the first to fourth embodiments, the stator (52) and the inner wall (10a) of the casing (10) make close contact with each other to partition the space in the casing (10) into the first space (S1) and the second space (S2) (see FIG. 4). However, the present invention is not limited to this example. A filler made of, for example, metal or resin, may be disposed between the stator (52) and the inner wall (10a) of the casing (10) to bring the stator (52) and the inner wall (10a) of the casing (10) into close contact with each other via the filler so that the space in the casing (10) is partitioned into the first space (S1) and the second space (S2).

<Variation of First Passage of Refrigerant Passage>
(2) A variation of the first passage (Z1) of the refrigerant passage (Z) will be described below. In the first to fourth embodiments, the first passage (Z1) extends from the first communication hole (91) to the first space (S1), passes through the bearing (81a) in the first space (S1), and communicates with the intermediate passage (Z2). However, the present invention is not limited to this example. A communication hole that allows the first space (S1) to communicate with the outside of the casing (10) may be formed in the second casing portion (12) of the casing (10) so that the first passage (Z1) extends from the communication hole to the first space (S1) and communicates with the intermediate passage (Z2) in the first space (S1).

INDUSTRIAL APPLICABILITY

As can be seen from the foregoing description, the present disclosure is useful for a rotor for a thrust magnetic bearing, a thrust magnetic bearing, and a rotary fluid machine.

20 Motor
30 Rotary Shaft
50 First Thrust Magnetic Bearing (Thrust Magnetic Bearing)
51 Rotor
93 Rotor Passage
Z Refrigerant Passage

The invention claimed is:
1. A rotor for a thrust magnetic bearing supporting a rotary shaft that is driven to rotate by a motor in an axial direction, wherein
the rotor is a component separate from the rotary shaft and is fitted on the rotary shaft, and
has a rotor passage that penetrates the rotor and constitutes part of a refrigerant passage for sending a refrigerant to the motor, the rotor passage includes an opening on one side in the axial direction and an opening on the other side in the axial direction, the opening on the one side is located radially outside of the opening on the other side, and the rotor is located on the other side of the motor in the axial direction.

2. The rotor of claim 1, wherein
the rotor passage includes a first rotor passage portion and a second rotor passage portion extending in directions perpendicular to each other.

3. A thrust magnetic bearing comprising:
the rotor of claim 1; and
a stator disposed to face the rotor.

4. The thrust magnetic bearing of claim 3, wherein
the refrigerant passage includes a stator passage provided in the stator.

5. The thrust magnetic bearing of claim 4, wherein
the refrigerant passage includes a rotor groove formed annularly along an outer periphery of the rotor.

6. A rotary fluid machine comprising:
the thrust magnetic bearing of claim 3;
the motor; and
the rotary shaft.

7. The rotary fluid machine of claim 6, further comprising:
a bearing that rotatably supports the rotary shaft, wherein
the bearing is disposed in the refrigerant passage.

8. The rotary fluid machine of claim 6, further comprising:
a grounding member that grounds the rotary shaft, wherein
the grounding member faces an axial portion of the rotary shaft.

9. The rotary fluid machine of claim 6, wherein
the motor is located on one side of the thrust magnetic bearing in the axial direction,
a first space is present on the other side of the thrust magnetic bearing in the axial direction,
a second space is present on the one side of the thrust magnetic bearing in the axial direction, and
the second space is more pressurized than the first space when the refrigerant is sent to the second space through the rotor passage.

10. The rotary fluid machine of claim 9, further comprising:
a casing that houses the thrust magnetic bearing, wherein
the thrust magnetic bearing partitions a space in the casing into the first space and the second space.

* * * * *